United States Patent
Lee et al.

(10) Patent No.: US 10,474,312 B2
(45) Date of Patent: Nov. 12, 2019

(54) OPERATION METHOD OF PORTABLE TERMINAL

(71) Applicant: LG ELECTRONICS INC., Seoul (KR)

(72) Inventors: Kyung Min Lee, Seoul (KR); Yong Taek Gong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 658 days.

(21) Appl. No.: 14/768,378

(22) PCT Filed: Feb. 18, 2013

(86) PCT No.: PCT/KR2013/001264
§ 371 (c)(1),
(2) Date: Aug. 17, 2015

(87) PCT Pub. No.: WO2014/126283
PCT Pub. Date: Aug. 21, 2014

(65) Prior Publication Data
US 2016/0004388 A1    Jan. 7, 2016

(51) Int. Cl.
*G06F 3/0481*    (2013.01)
*G09G 5/14*    (2006.01)
(Continued)

(52) U.S. Cl.
CPC .......... *G06F 3/0481* (2013.01); *G06F 3/0482* (2013.01); *G06F 3/0486* (2013.01);
(Continued)

(58) Field of Classification Search
CPC .... G06F 3/0482; G06F 3/0483; G06F 3/0481; G06F 17/2247
See application file for complete search history.

(56) References Cited

U.S. PATENT DOCUMENTS

2007/0288863 A1*  12/2007  Ording ................ G06F 3/0481
                                                                 715/788
2009/0158212 A1*   6/2009  Dykstra-Erickson ........
                                                                 G06F 3/0482
                                                                 715/811
(Continued)

FOREIGN PATENT DOCUMENTS

KR         10-1139688 B1    5/2012
KR     10-2012-0058050 A    6/2012
(Continued)

*Primary Examiner* — Justin S Lee
(74) *Attorney, Agent, or Firm* — Birch, Stewart, Kolasch & Birch, LLP

(57) ABSTRACT

An operation method of a portable terminal according to an embodiment of the present invention comprises the steps of: entering a window screen movement mode in which a window screen of a foreground task is displayed uppermost and one or more window screens are stacked in multiple layers under the window screen of the foreground task; selecting a window screen from a plurality of window screens according to a user's movement command; changing the transparency of at least a part of areas of window screens stacked on the selected window screen; and displaying the selected window screen as a foreground screen and terminating the window screen movement mode when an input determining the selected window screen is received. Therefore, it is possible to switch screens and tasks more swiftly and conveniently, thereby improving user convenience.

10 Claims, 15 Drawing Sheets

(51) Int. Cl.
*G06F 3/0482* (2013.01)
*G06F 3/0484* (2013.01)
*G06F 3/0486* (2013.01)

(52) U.S. Cl.
CPC ........... *G06F 3/04842* (2013.01); *G09G 5/14*
(2013.01); *G06F 2203/04101* (2013.01); *G06F 2203/04105* (2013.01); *G06F 2203/04804* (2013.01); *G09G 2340/10* (2013.01); *G09G 2354/00* (2013.01)

(56) References Cited

U.S. PATENT DOCUMENTS

| | | |
|---|---|---|
| 2012/0015693 A1 | 1/2012 | Choi et al. |
| 2012/0052817 A1 | 3/2012 | Lee et al. |
| 2013/0174179 A1* | 7/2013 | Park .................. G06F 3/0483 718/107 |
| 2013/0254694 A1 | 9/2013 | Lee |
| 2014/0053116 A1* | 2/2014 | Smith .................. G06F 9/4443 715/863 |

FOREIGN PATENT DOCUMENTS

| | | |
|---|---|---|
| KR | 10-2012-0099913 A | 9/2012 |
| WO | WO 2012/008628 A1 | 1/2012 |
| WO | WO 2012/030001 A1 | 3/2012 |

* cited by examiner

OPERATION METHOD OF PORTABLE TERMINAL

TECHNICAL FIELD

The present invention relates to a portable terminal and a method of operating the same and, more particularly, to a portable terminal and a method of operating the same, which are capable of rapidly and conveniently switching screens.

BACKGROUND ART

A mobile terminal is a portable device having at least one of a function for performing voice and video communication, a function for inputting and outputting information, and a function for storing data. Such a mobile terminal has complicated functions such as photographing of photos, capturing of moving images, playback of music files or moving image files, reception of games or broadcasts, or wireless Internet and has been implemented as a multimedia player, as the functions thereof have been diversified.

New attempts have been variously given to the mobile terminal implemented as the multimedia player in hardware or software in order to implement complicated functions. For example, there is a user interface environment for enabling a user to easily and conveniently search for or select a function.

SUMMARY OF THE INVENTION

An object of the present invention devised to solve the problem lies in a portable terminal and a method of operating the same, which are capable of improving user convenience.

An object of the present invention devised to solve the problem lies in a portable terminal and a method of operating the same, which are capable of rapidly and conveniently switching screens and tasks.

The object of the present invention can be achieved by providing a method of operating a portable terminal including entering a window screen movement mode in which a window screen of a foreground task is displayed on top and one or more window screens are stacked in a plurality of layers under the window screen of the foreground task, selecting one of a plurality of window screens according to a movement command of a user, changing transparency of at least some regions of a window screen stacked on the selected window screen among the plurality of window screens, and displaying the selected window screen as a foreground screen and finishing the window screen movement mode, when input of deciding the selected window screen is received.

In another aspect of the present invention, provided herein is a method of operating a portable terminal including stacking and displaying a plurality of window screens in a plurality of layers, selecting one of the plurality of window screens according to a movement command of a user, changing transparency of at least some regions of a window screen stacked on the selected window screen among the plurality of window screens, and displaying the selected window screen as a full screen when input of deciding the selected window screen is received.

According to the embodiments of the present invention, it is possible to rapidly and conveniently switch screens and tasks and to improve user convenience.

DETAILED DESCRIPTION OF THE EMBODIMENTS

Exemplary embodiments of the present invention will be described with reference to the attached drawings.

A mobile terminal described in the present specification includes a mobile phone, a smart phone, a laptop, a digital broadcast terminal, a personal digital assistant (PDA), a portable multimedia player (PMP), a camera, a navigation system, a tablet computer, an e-book terminal, etc. The terms "module" and "unit" attached to describe the names of components are used herein to help the understanding of the components and thus they should not be considered as having specific meanings or roles. Accordingly, the terms "module" and "unit" may be used interchangeably.

Figure 1:
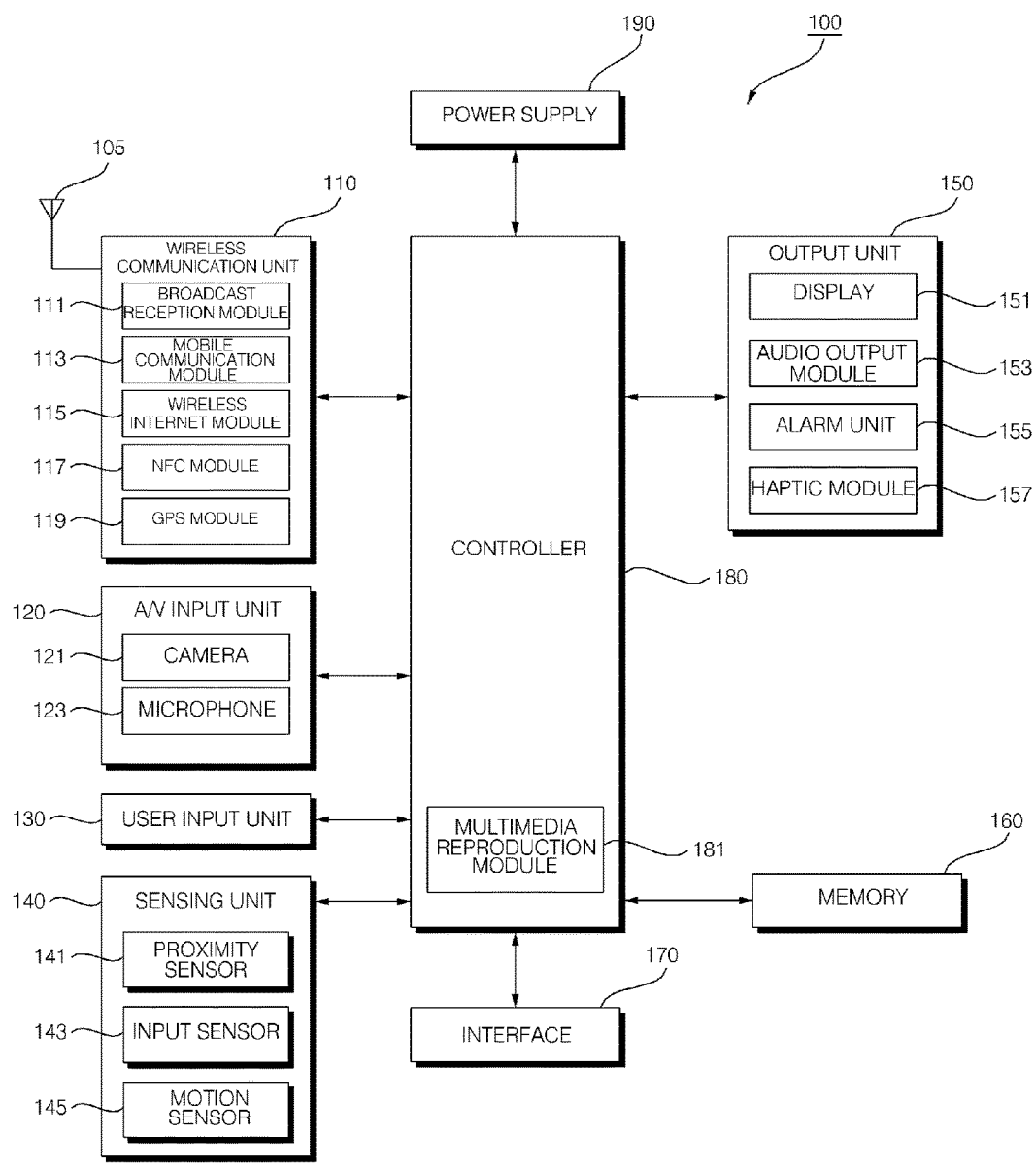
FIG. 1 is a block diagram of a portable terminal according to one embodiment of the present invention.

FIG. 1 is a block diagram showing the configuration of a mobile terminal according to an embodiment of the present invention. The components of the mobile terminal according to the embodiment of the present invention will be described with reference to FIG. 1.

Referring to FIG. 1, the mobile terminal 100 may include a wireless communication system 110, an audio/video (A/V) input unit 120, a user input unit 130, a sensing unit 140, an output unit 150, a memory 160, an interface 170, a controller 180 and a power supply 190. Two or more components may be combined into one component or one component may be divided into two or more components, as necessary.

The wireless communication unit 110 may include a broadcast reception module 111, a mobile communication module 113, a wireless Internet module 115, a near field communication (NFC) module 117, a global positioning system (GPS) module 119, etc.

The broadcast reception module 111 receives at least one of a broadcast signal and broadcast-related information from an external broadcast management server through a broadcast channel. The broadcast channel may include a satellite channel and a terrestrial channel. The broadcast management server may refer to a server for generating and transmitting at least one of a broadcast signal and broadcast-related information or a server for receiving and transmitting at least one of a previously generated broadcast signal and broadcast-related information to a terminal.

The broadcast signal may include not only a TV broadcast signal, a radio broadcast signal and a data broadcast signal but also a broadcast signal obtained by combining a TV broadcast signal or a radio broadcast signal with a data broadcast signal. The broadcast-related information may refer to information related to a broadcast channel, a broadcast program or a broadcast service provider. The broadcast-related information may be provided via a mobile communication network and, in this case, may be received by the mobile communication module 113. The broadcast-related information may have various formats.

The broadcast reception module 111 receives a broadcast signal using various broadcast systems. More particularly, the broadcast reception module 111 may receive a digital broadcast signal using a digital broadcast system such as digital multimedia broadcasting-terrestrial (DMB-T), digital multimedia broadcasting-satellite (DMB-S), Media Forward Link Only (MediaFLO), digital video broadcast-handheld (DVB-H) or integrated services digital broadcast-terrestrial (ISDB-T). The broadcast reception module 111 may be configured to suit not only a digital broadcast system but also all broadcast systems for providing broadcast signals. The broadcast signal and/or the broadcasted-related information received through the broadcast reception module 111 may be stored in the memory 160.

The mobile communication module 113 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 115 is an internal or external module for wireless Internet access which may be provided to the mobile terminal 100. As wireless Internet technologies, Wireless LAN (WLAN)(Wi-Fi), Wireless broadband (WiBro), World Interoperability for Microwave Access (Wi-Max) or High Speed Downlink Packet Access (HSDPA), etc. may be used.

The NFC module 117 may perform NFC. As NFC technologies, Bluetooth, Radio Frequency Identification (RFID), Infrared Data Association (IrDA), Ultra Wideband (UWB), ZigBee, etc. may be used.

The GPS module 119 may receive position information from a plurality of GPS satellites.

The A/V input unit 120 receives an audio signal or a video signal and may include a camera 121 and a microphone 123. The camera 121 processes a video frame of a still image or a moving image obtained by an image sensor in a video call mode or a photographing mode. The processed video frame may be displayed on the display 151.

The video frame processed by the camera 121 may be stored in the memory 160 or externally transmitted through the wireless communication unit 110. The number of cameras 121 may be two or more according to the configuration of the terminal.

The microphone 123 receives an external audio signal in a call mode, a recording mode or a voice recognition mode and converts the external audio signal into electrical audio data. The processed audio data may be converted into a format transmittable to a mobile communication base station through the mobile communication module 113 to be output in a call mode. The microphone 123 may use various noise elimination algorithms for eliminating noise generated in a process of receiving the external audio signal.

The user input unit 130 generates key input data enabling the user to control the operation of the terminal. The user input unit 130 may include a keypad, a dome switch, a touchpad (static pressure/static electrical), etc., which are capable of receiving a command or information by a push or touch operation of the user. The user input unit 130 may include a jog wheel for rotating a key, a joystick, a finger mouse, etc. In particular, if the touchpad and the display 151 have a layered structure, it may be called a touchscreen.

The sensing unit 140 detects a current state of the mobile terminal 100 such as whether the mobile terminal 100 is opened or closed, the position of the mobile terminal 100 and contact/non-contact of a user and generates a sensing signal for controlling the operation of the mobile terminal 100. For example, if the mobile terminal 100 is a slide phone, the sensing unit 140 may sense whether the slide phone is opened or closed. The sensing unit 140 may sense whether or not the power supply 190 supplies power or whether or not an external device is connected through the interface 170.

The sensing unit 140 may include a proximity sensor 141, a pressure sensor 143 and a motion sensor 145. The proximity sensor 141 detects presence/absence of an object which approaches the mobile terminal 100 or an object located in the vicinity of the mobile terminal 100 without mechanical contact. The proximity sensor 141 may detect an object approaching the mobile terminal using a change in an AC magnetic field, a change in a static magnetic field or a rate of change in capacitance. In addition, the proximity sensor may detect which surface of the mobile terminal 100 is gripped by a user. The number of proximity sensors 141 may be two or more according to the configuration of the terminal.

The pressure sensor 143 may detect whether pressure is applied to the mobile terminal 100 or the level of the pressure. The pressure sensor 143 may be mounted at a position where pressure applied to the mobile terminal 100 needs to be detected according to a use environment.

If the pressure sensor 143 is mounted in the display 151, touch input through the display 151 and pressure touch input having pressure greater than that of the touch input may be identified according to the signal output from the pressure sensor 143. The level of the pressure applied to the display 151 may be detected according to the signal output from the pressure sensor 143 upon pressure touch input.

If the pressure sensor 143 is mounted in an edge of the mobile terminal 100, pressure may be detected to detect on which surface of the mobile terminal 100 the user keeps a grip.

The motion sensor 145 may sense motion or position of the mobile terminal 100 using an acceleration sensor, a gyroscopic sensor, etc. In particular, as the acceleration sensor which may be used in the motion sensor 145, a sensor for converting an acceleration change in one direction into an electrical signal has been widely used with development of a micro-electromechanical system (MEMS).

The acceleration sensor may include various sensors such as an acceleration sensor which may be mounted in an airbag system of a vehicle to measure acceleration having a large value used to detect collision and an acceleration sensor which may measure acceleration having a small value used as an input means of a game console. Two-axis or three-axis acceleration sensors may be mounted in one package or only a Z-axis acceleration sensor may be mounted according to use environment. Accordingly, for certain reasons, if a X-axis or Y-axis acceleration sensor is used instead of the Z-axis acceleration sensor, the acceleration sensor may be mounted on a main board in an erect state using a separate board piece.

The gyroscopic sensor measures an angular speed and senses a direction in which the mobile terminal rotates from a reference direction.

The sensing unit 140 may include sensors for user authentication. For example, if user authentication is performed using biometric data of the user, a sensor for sensing temperature, fingerprint, iris or face may be included and a necessary sensor may be included according to a user authentication method set in the mobile terminal 100.

The output unit 150 outputs an audio signal, a video signal or an alarm signal. The output unit 150 may include a display 151, an audio output module 153, an alarm unit 155 and a haptic module 157.

The display 151 displays information processed by the mobile terminal 100. For example, if the mobile terminal 100 is in a call mode, the display displays a user interface (UI) or a graphical user interface (GUI) related to a call. If the mobile terminal 100 is in a video call mode or a photographing mode, the display may individually or simultaneously display the photographed or received images and display a UI and a GUI.

As described above, if the display 151 and the touchpad have the layered structure to configure the touchscreen, the display 151 can be used not only as an output device but also as an input device for inputting information via touch.

If the display 151 is a touchscreen, the display may include a touchscreen panel, a touchscreen panel controller, etc. In this case, the touchscreen panel is a transparent panel attached to the outside of the display and may be connected to an internal bus of the mobile terminal 100. The touchscreen panel receives a touch input and sends a signal corresponding to the touch input to the touchscreen panel controller. The touchscreen panel controller processes the received signal, transmits data corresponding to the signal to the controller 180, and enables the controller 180 to detect whether the touch input is received or which portion of the touchscreen is touched.

The display 151 may include e-paper. The e-paper may be a reflection type display and has high resolution, wide viewing angle and excellent visual characteristics due to a bright white background, similarly to paper and ink. The e-paper may be implemented on a certain board such as plastic, metal, or paper, an image is maintained even after power is turned off, and the lifespan of the battery of the mobile terminal 100 may be increased because a backlight power source is not used. As the e-paper, a semispherical twisted ball charged with electric charges, electrophoresis, a microcapsule, etc. may be used.

The display 151 may include at least one of a liquid crystal display, a thin film transistor-liquid crystal display, an organic light emitting diode, a flexible display and a 3-dimensional (3D) display. The number of displays 151 may be two or more according to implementations of the mobile terminal 100. For example, the mobile terminal 100 may include both an external display (not shown) and an internal display (not shown).

The audio output module 153 may output audio data received from the wireless communication module 110 or stored in the memory 160 in call signal reception, a call mode, a recording mode, a voice recognition mode or a broadcast reception mode. The audio output module 153 outputs an audio signal associated with the functions performed by the mobile terminal 100, such as call signal reception sound or message reception sound. The audio output module 153 may include a speaker, a buzzer, etc.

The alarm unit 155 outputs a signal notifying the user that an event has occurred in the mobile terminal 100. Examples of the event which has occurred in the mobile terminal 100 include call signal reception, message reception, key signal input, etc. The alarm unit 155 outputs a signal notifying the user of the occurrence of an event in the other form in addition to an audio or video signal. For example, the alarm unit may output the signal in the form of vibrations. If a call signal or a message is received, the alarm unit 155 may output a signal notifying the user that the call signal or the message has been received. If a key signal is received, the alarm unit 155 may output a signal as a feedback signal of the key signal. The user may recognize occurrence of the event through the signal output from the alarm unit 155. The signal notifying the user that the event has occurred in the mobile terminal 100 may be output through the display 151 or the audio output module 153.

The haptic module 157 generates a variety of tactile effects that the user can feel. A typical example of the tactile effect generated by the haptic module 157 is vibration. If the haptic module 157 generates vibrations as a tactile effect, the intensity and pattern of the vibrations generated by the haptic module 157 may be changed and different vibrations may be combined and output or may be sequentially output.

The haptic module 157 may generate a variety of tactile effects such as an effect due to stimulus through arrangement of pins which vertically move with respect to a contact skin surface, an effect due to stimulus through air ejection force or absorption force through an ejection hole and an absorption hole, an effect due to stimulus through contact of an electrode, an effect due to stimulus using electrostatic force, or an effect due to cold and warmth using a heat absorption or heating element. The haptic module 157 may deliver the tactile effect through direct contact or enable the user to feel the tactile effect through kinaesthesia of a finger or arm of the user. The number of haptic modules 157 may be two or more according to the configuration of the mobile terminal 100.

The memory 160 may store a program for processing and control of the controller 180 and may temporarily store input or output data (for example, a phonebook, messages, audio, still images, and moving images).

The memory 160 may include at least one of a flash memory type, hard disk type, multimedia card micro type or card type memory (e.g., an SD or XD memory, etc.), a RAM and a ROM. The mobile terminal 100 may manage a web storage for performing a storage function of the memory 150 over the Internet.

The interface 170 serves as an interface with all external devices connected to the mobile terminal 100. Examples of the external device connected to the mobile terminal 100 include a wired/wireless headset, an external charger, a wired/wireless data port, a card socket such as a memory card, a subscriber identification module (SIM) card or a user identity module (UIM) card, an audio input/output (I/O) terminal, a video I/O terminal, and an earphone. The interface 170 may receive data from an external device or receive power and transmit power to the components of the mobile terminal 100 or transmit data of the mobile terminal 100 to an external device.

The interface 170 may become a passage through which power is supplied from an external cradle to the mobile terminal 100 when the mobile terminal is connected to the external cradle or a passage through which a variety of command signals received from the cradle by the user is delivered to the mobile terminal 100.

The controller 180 controls the operations of the units and controls the overall operation of the mobile terminal 100. For example, the controller performs control and processing associated with a voice call, data communication, a video call, etc. The controller 180 may include a multimedia reproduction module 181 for multimedia reproduction. The multimedia reproduction module 181 may be implemented in the controller 180 in hardware form or may be implemented in software form separately from the controller 180.

The power supply 190 receives external power or internal power and supplies power required for operation to each component under control of the controller 180.

The mobile terminal 100 having the above configuration includes a wired/wireless communication system and a satellite based communication system so as to operate in a communication system for transmitting data through a frame or packet.

Figure 2:
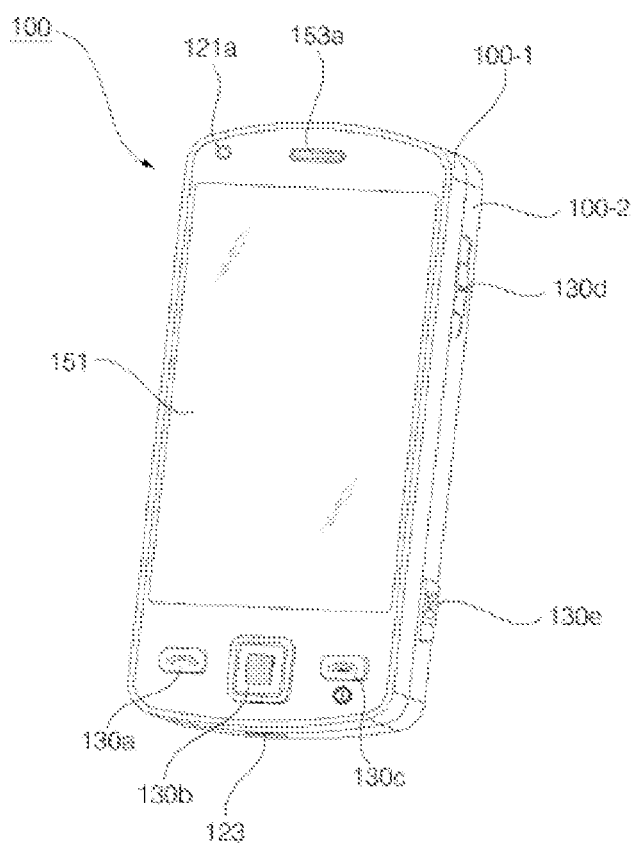
FIG. 2 is a perspective view of a portable terminal according to one embodiment of the present invention when viewed from a front side thereof.
Figure 3:
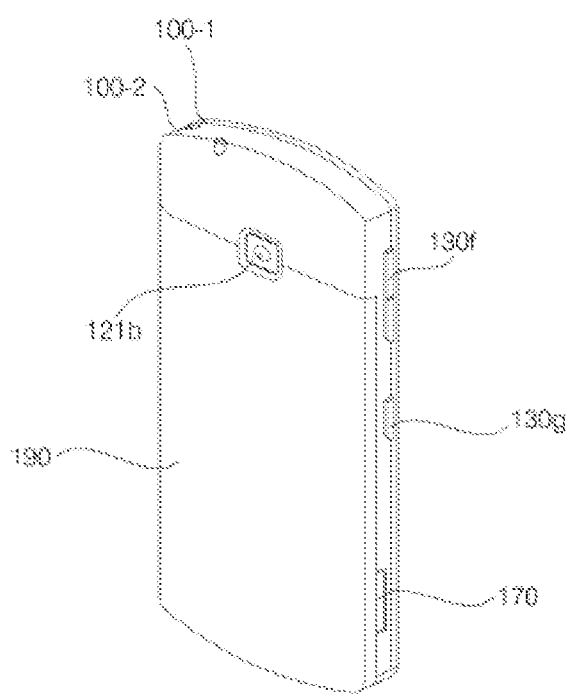
FIG. 3 is a perspective view of the mobile terminal according to one embodiment of the present invention when viewed from a rear side thereof.

FIG. 2 is a perspective view of a mobile terminal according to an embodiment of the present invention when viewed from a front side thereof, and FIG. 3 is a perspective view of the mobile terminal shown in FIG. 2 when viewed from a rear side thereof. Hereinafter, the appearance of the mobile terminal according to the present invention will be described with reference to FIGS. 2 and 3. Hereinafter, for convenience, among folder type, bar type, swing type and slider type mobile terminals, a bar type mobile terminal including a touchscreen at a front side thereof will be described. However, the present invention is not limited to the bar type mobile terminal and is applicable to all types of mobile terminals including the above-described types.

Referring to FIG. 2, a case forming the appearance of the mobile terminal 100 includes a front case 100-1 and a rear case 100-2. In a space formed by the front case 100-1 and the rear case 100-2, various electronic parts are mounted.

In a main body, that is, in the front case 100-1, a display 151, a first audio output module 153a, a first camera 121a and first to third user input units 130a, 130b and 130c are arranged. A fourth user input unit 130d, a fifth user input unit 130e and a microphone 123 may be arranged on the side surface of the rear case 100-2.

The display 151 and a touch pad have the layered structure to configure the touchscreen so as to enable the user to input information through touch.

The first audio output module 153a may be implemented in the form of a receiver or a speaker. The first camera 121a may be implemented in a form suitable for photographing an image of the user or capturing moving image of the user. The microphone 123 may be implemented in a form suitable for receiving user voice or other sounds.

The first to fifth user input units 130a, 130b, 130c, 130d and 130e and the below-described sixth and seventh user input units 130f and 130g may be collectively referred to as a user input unit 130 and any tactile manner for operating the mobile terminal while providing a tactile effect to the user may be employed.

For example, the user input unit 130 may be implemented in the form of a dome switch or a touch pad which is capable of receiving a command or information by a push or touch operation of the user or in the form of a jog wheel for rotating a key, or a joystick. The first to third user input units 130a, 130b and 130c are used to input a command such as start, end, scroll, etc. and the fourth user input unit 130d is used to input choice of an operation mode. The fifth user input unit 130e may function as a hot key for activating a special function of the mobile terminal 100.

Referring to FIG. 3, a second camera 121b may be mounted on a rear surface of the rear case 100-2 and the sixth and seventh user input units 130f and 130g and an interface 170 are disposed on a side surface of the rear case 100-2.

The second camera 121b has a photographing direction substantially opposite to that of the first camera 121a and may have pixels different from those of the first camera 121a. A flash (not shown) and a mirror (not shown) may be further provided near the second camera 121b. Another camera may further be mounted near the second camera 121b to be used to capture a three-dimensional image.

The flash illuminates a subject when the subject is captured using the second camera 121b. The mirror enables the user to view his/her face when the picture of the user is taken by himself/herself using the second camera 121b (self photographing).

In the rear case 100-2, a second audio output module (not shown) may further be included. The second audio output module may perform a stereo function along with the first audio output module 153a and may be used for a call in a speakerphone mode.

The interface 170 may be used as a passage through which data is exchanged with an external device. A broadcast signal reception antenna (not shown) may be provided in one of the front case 100-1 and the rear case 100-2 in addition to an antenna for telephone call. The antenna may be retractable from the rear case 100-2.

A power supply 190 for supplying power to the mobile terminal 100 may be mounted at the side of the rear case 100-2. The power supply 190 is, for example, a rechargeable battery and may be detachably coupled to the rear case 100-2, for charging.

Although the second camera 121b is mounted on the rear case 100-2 in the above description, the present invention is not limited thereto.

Alternatively, the second camera 121b may not be separately included, but the first camera 121a may be rotatably formed to photograph a subject located in the photographing direction of the second camera 121b.

Figure 4:
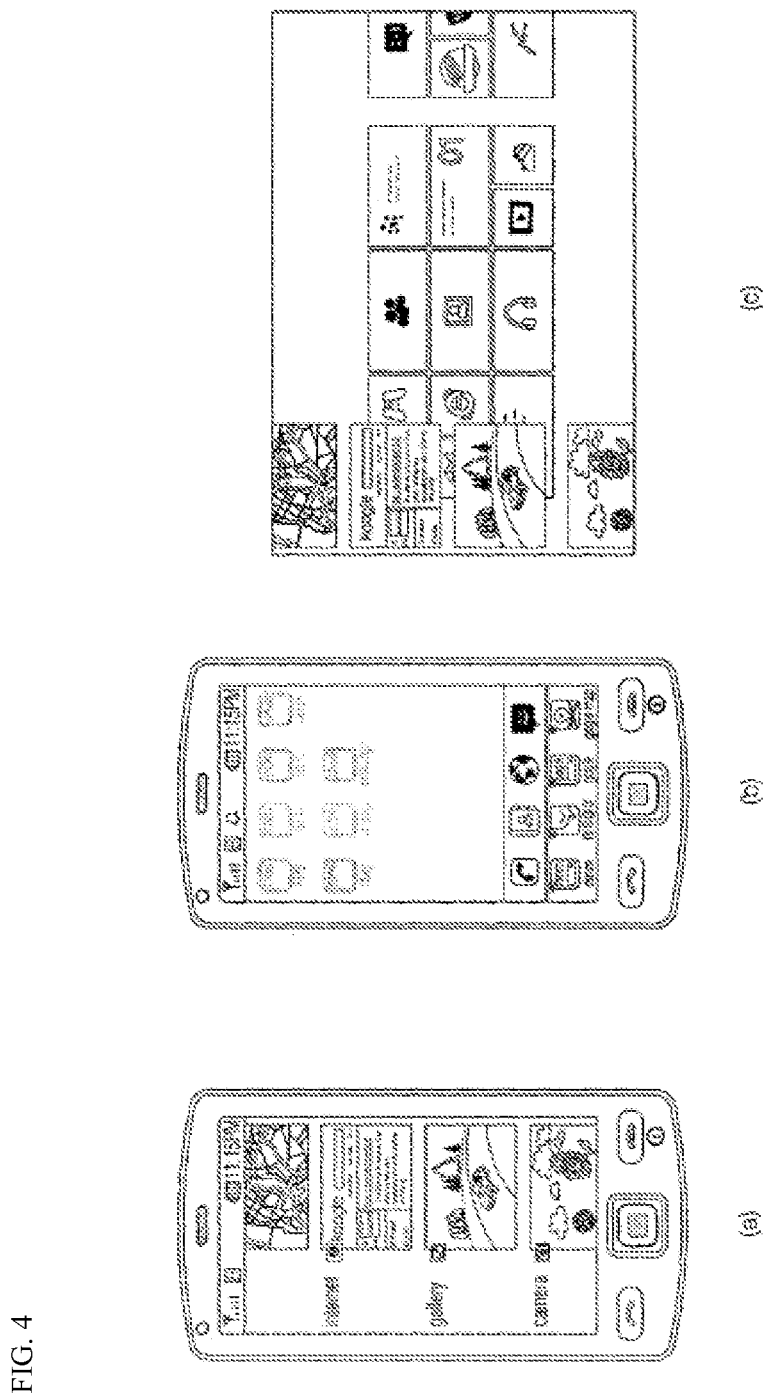
FIGS. 4 to 6 are views referred to for describing a conventional method for operating a portable terminal.
Figure 5:
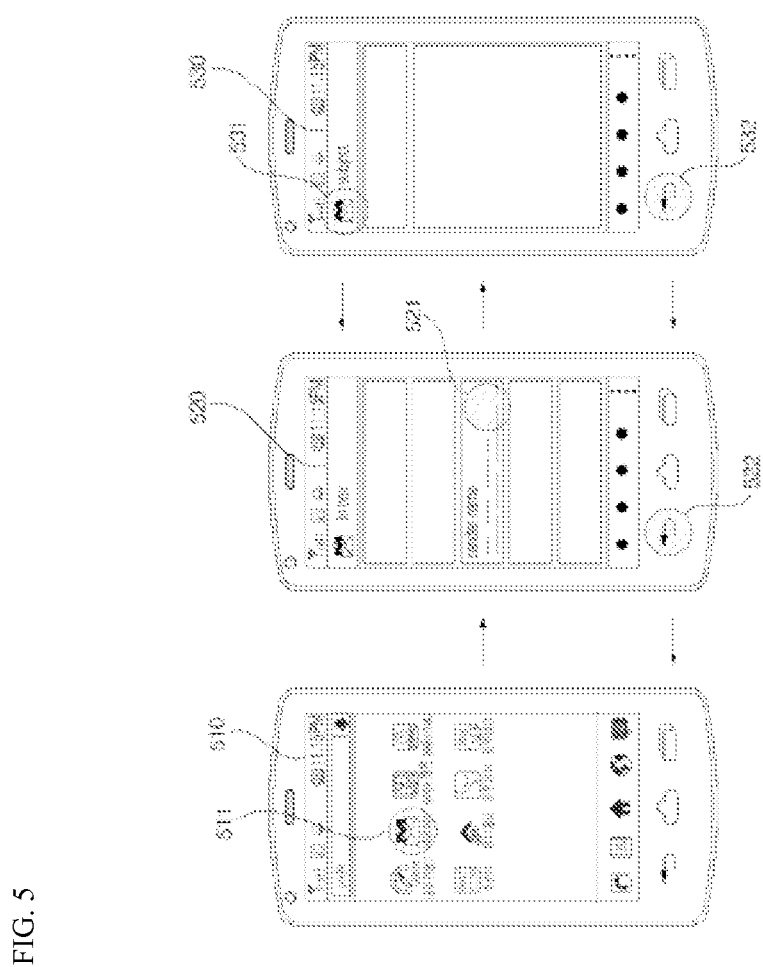
Figure 6:
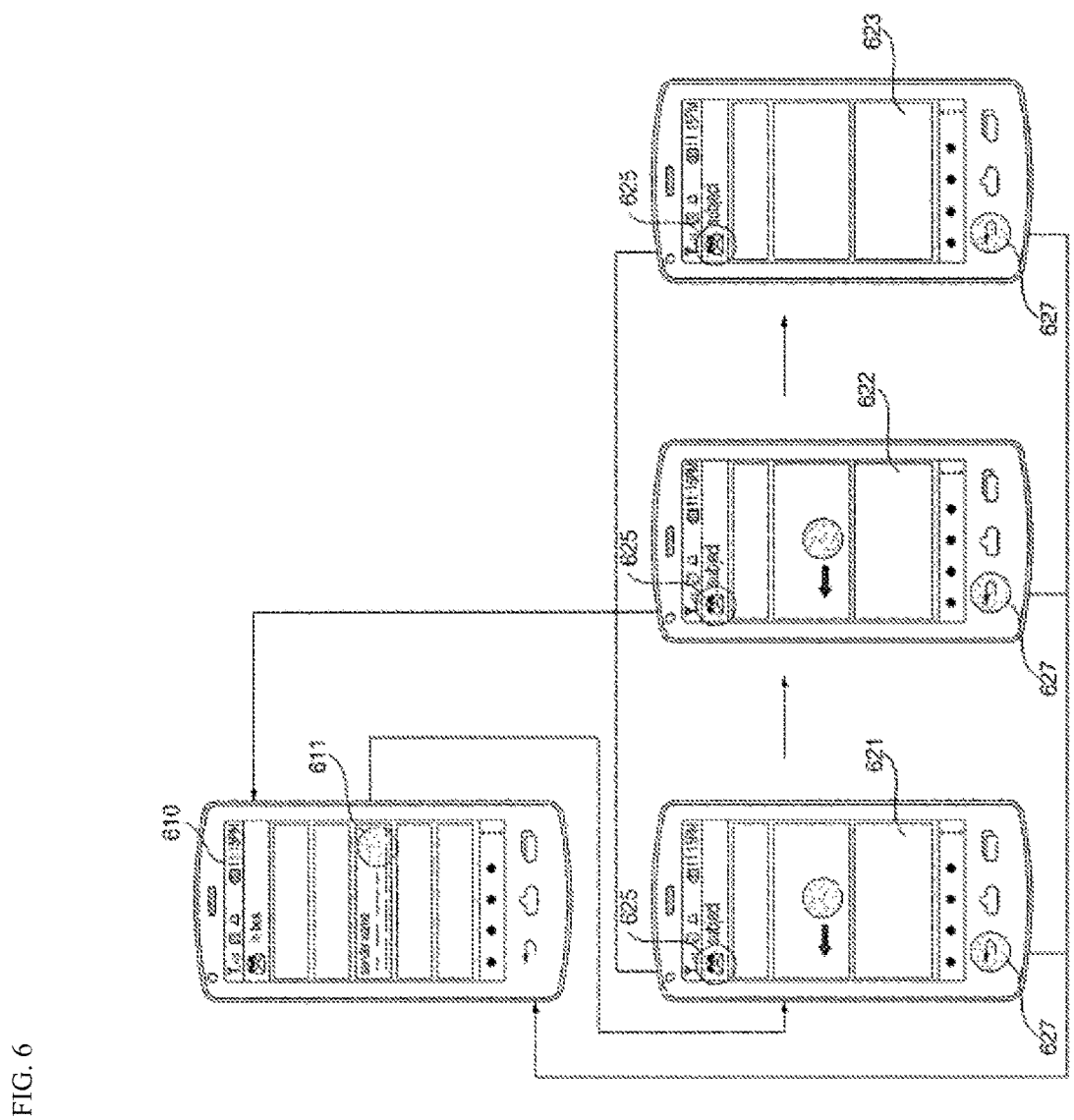

FIGS. 4 to 6 are views referred to for describing a conventional method for operating a portable terminal.

As the functions of the portable terminal have been diversified, a multitasking function for simultaneously performing various tasks such as sending a message while listening to music and playing a game while downloading data has been enhanced.

Most general operating systems currently used in a portable terminal support a multitasking function for executing two or more applications. In this case, one application program which currently receives user input may be referred to as a foreground task and all the remaining application programs may be referred to as background tasks.

However, portable terminals generally have relatively small screen size. Accordingly, due to limited screen size, only the window screen of a foreground task is displayed on a screen and the window screen of a background task is not displayed on the screen. In addition, data about switching to the window screen of the background task may be stored to be displayed when being switched to the foreground task or a visible state according to a predetermined command or according to circumstance.

Tasks which are not displayed on the screen in a multitasking environment may be performed in the background. Since the portable terminal has a restricted screen size, it is difficult to simultaneously display a plurality of application programs on a screen. Therefore, most of the application programs are executed in the background without being displayed on the screen and only a specific application is displayed on the screen.

Accordingly, in the multitasking environment, there is a need for a user interface for rapidly switching application programs or screens.

FIG. 4 shows examples of switching an application program in a multitasking environment in various operating systems. More specifically, a method of viewing a list of recently used applications is shown.

Referring to (a) of FIG. 4, a screen for displaying thumbnail images of window screens corresponding to a plurality of tasks is displayed according to a user command and a task and window screens may be switched according to user selection.

Alternatively, referring to (b) of FIG. 4, icons corresponding to different application programs may be displayed in one region of a screen, e.g., the lower side of the screen and, when a user touches an icon, an application corresponding to the icon among the applications in the background state may be switched to the foreground state and displayed on the full screen.

Alternatively, referring to (c) of FIG. 4, thumbnail images of the window screens corresponding to a plurality of tasks are displayed in one region of a screen, e.g., the left side of the screen and a task and window screen is switched according to user selection.

Accordingly, when the user selects any one of the window screens or icons corresponding to the plurality of tasks, the screen is switched to the window screen of the task corresponding thereto and the task desired by the user is performed. However, unlike a PC or TV, in the portable terminal having a small screen, it is difficult for a user to check information on the application programs executed in the background at a glance due to limited screen size and to appropriately perform a multitasking function supported by the portable terminal because the application programs are sequentially switched.

For example, as shown in FIG. 4, the plurality of thumbnail images has a very small size. Accordingly, it is difficult for the user to intuitively check the content of the thumbnail image and the icon. In addition, the number of images displayed on one screen may be restricted and only switching between application programs is possible and switching of the window screens in one application program is not possible.

FIGS. 5 and 6 show examples of a conventional screen movement and navigation method.

Most portable terminals display only one window screen due to limited screen size. Accordingly, for movement between window screens, movement to a screen predetermined by a developer using a back button or an up button is possible.

Referring to FIG. 5, when a user executes a predetermined application 511 on a home screen 510, an execution screen 520 of the application 511 is displayed on the full screen of a display 151 in the foreground.

The user may select a back button 522 to return to the home screen or may select any one 521 of a plurality of items to identify a screen 530 corresponding to the selected item.

Even on the predetermined screen 530, the back button 532 may be selected to return to a previous screen 520 and the up button 531 may be selected to return to the screen 520 having a higher level.

Referring to FIG. 6, when a specific item 611 is selected on a high-level screen of a predetermined application, a low-level screen 621 corresponding to the specific item may be displayed. The user may switch the low-level screen to a screen 622 or 623 having the same level via dragging input.

Even in this case, the user may select the back button 627 to return to the previous screen or select the up button 625 to return to the high-level screen 610.

As described with reference to FIGS. 5 and 6, the application and window screen is switched only using a method predefined by the developer.

Accordingly, movement between window screens, e.g., activities, is possible only using the method specified/implemented in the application, and the user may not arbitrarily move to a specific activity.

For example, when activity 1 is first displayed as foreground activity and then is switched to activity 2, activity 2 is displayed as foreground activity and activity 1 is switched to background activity and is located under activity 2 in an activity stack.

Thereafter, when the user switches to activity 3, activity 3 is displayed as foreground activity and activity 2 is switched to background activity and is located under foreground activity 3 and above activity 1 in the activity stack structure.

When the user switches to activity 2 again via the back button, etc., activity 3 is deleted.

That is, since the history of activities is linearly maintained, movement to an arbitrary screen is difficult. Since a current activity (screen) is deleted from the history using the back button, forward movement may not be performed.

Accordingly, the present invention provides a method of enabling free movement to a screen desired by a user. Accordingly, it is possible to increase user convenience.

Figure 7:
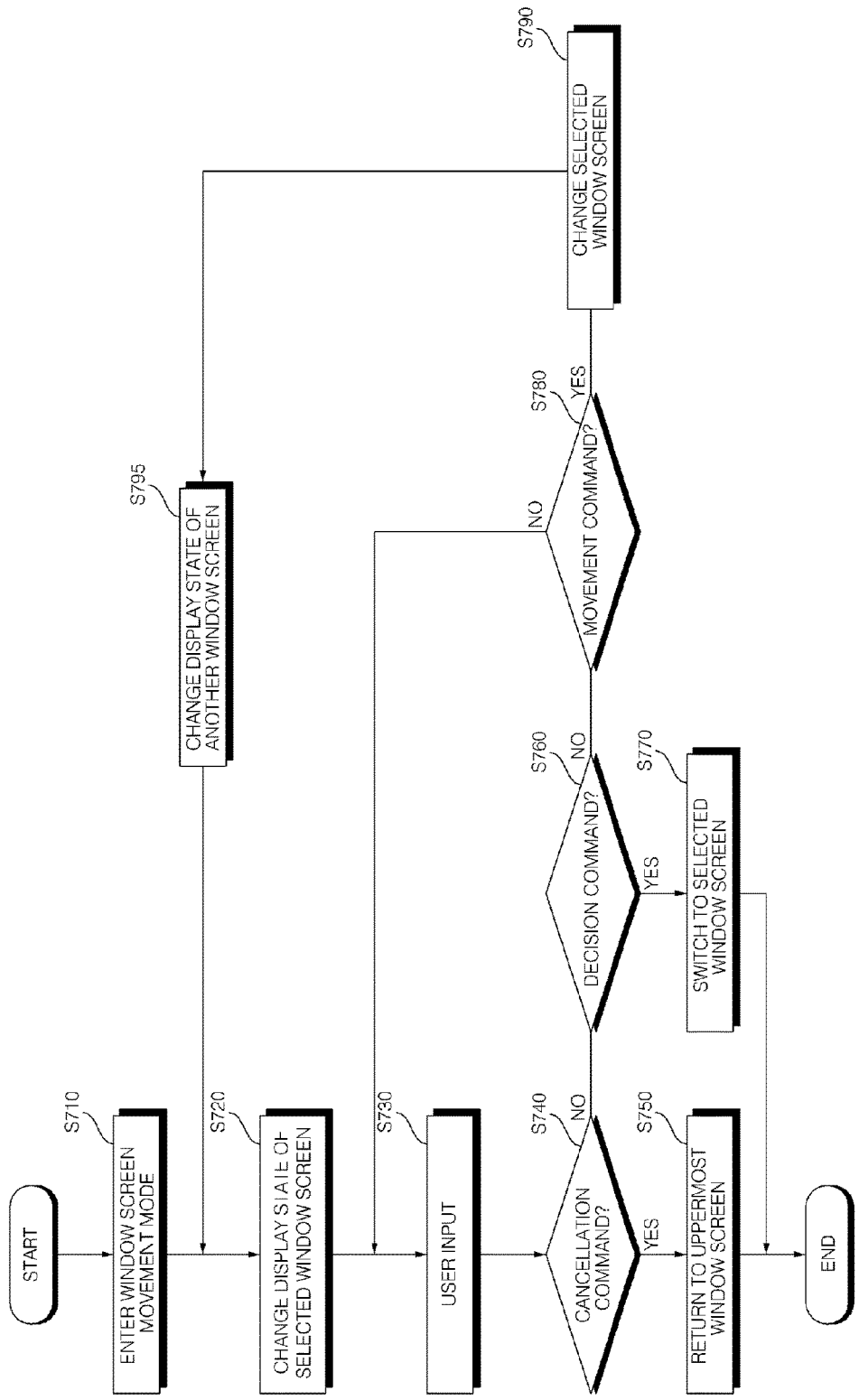
FIG. 7 is a flowchart illustrating a method of operating a portable terminal according to one embodiment of the present invention.

FIG. 7 is a flowchart illustrating a method of operating a portable terminal according to one embodiment of the present invention.

Referring to FIG. 7, first, the portable terminal enters a window screen movement mode according to a user command (S710). When the user presses a specific button or makes predetermined motion, a controller 180 may perform control such that the portable terminal is switched to the window screen movement mode. In the window screen movement mode, a plurality of window screens may be represented by a stack of cards.

The plurality of stacked window screens includes the window screen of a foreground task. The window screen of the foreground task may be displayed on top and one or more window screens may be displayed in a plurality of layers under the window screen of the foreground task.

Here, one or more window screens stacked under the window screen of the foreground task may be the window screens of background tasks.

Accordingly, in the window screen movement mode according to one embodiment of the present invention, cards composed of window screens are stacked in a plurality of layers and the window screen of the foreground task is displayed on top, so as to be visible to the user.

According to one embodiment of the present invention, in the window screen movement mode, the window screen of the task displayed on a main screen, e.g., the screen of a currently executed application is displayed on top and a stack of the screens of applications switched to the background state may be displayed.

That is, the controller 180 may perform control to display a screen of a visualized stack structure, in which the window screen of the foreground task is displayed on top and a stack of one or more window screens is displayed in a plurality of layers under the window screen of the foreground task, on the display 151, when entering the window screen movement screen.

Accordingly, the user can intuitively and rapidly check the number of window screens left in the history or the number of applications operating in the background via the visualized stack structure.

In step S710 of entering the window screen movement mode, only some of one or more window screens stacked under the window screen of the foreground task may be displayed. The controller 180 may perform control to display the window screen of the foreground task without change and to display only the shape of the remaining window screens stacked under the window screen of the foreground task or only the edges of the remaining window screens.

Step S710 of entering the window screen movement mode is characterized in that the window screen of the foreground task is scaled down and displayed. When entering the window screen movement mode, the controller 180 may perform control to scale down the window screen displayed on the full screen.

According to the embodiment, the process of scaling down the window screen of the foreground task is displayed on the display 151 to visually display entrance into the window screen movement mode.

In addition, in step S710 of entering the window screen movement mode, the plurality of window screens may be displayed such that the window screen of a recently used task is located at a higher layer. The controller 180 may consecutively arrange the plurality of window screens in order of use. For example, a window screen used upon entering the window screen movement mode is displayed on top and window screens used earlier are sequentially arranged toward the bottom of the plurality of layers. Accordingly, an oldest window screen left in the history is located at the bottom of the stack structure composed of the plurality of layers.

According to the embodiment, at least one of the plurality of layers may include a plurality of window screens. That is, two or more window screens may be arranged in at least one layer.

In step S710 of entering the window screen movement mode, a window screen branched from the plurality of window screens may include a window screen satisfying a predetermined criterion. That is, all overlapping window screens may be maintained by branch in one embodiment or some overlapping window screens may be deleted according to settings of the overlapping window screens in another embodiment.

In the present specification, branched window screens refer to several low-level window screens connected to one high-level window screen. For example, the window screens 610, 621, 622 and 623 may correspond to the branched window screens.

Since switching between the high-level and low-level window screens is frequently performed using the up/back button, the necessity of maintaining data of some window screens is relatively low.

Accordingly, in one embodiment of the present invention, data related to some window screens may not be maintained in the history stored in the memory 160 but may be deleted according to predetermined criteria.

The method of operating the portable terminal according to one embodiment of the present invention may further include changing the display state of the selected window screen (S720).

The controller 180 may perform control to change the display state, such as at least one of the color, size, thickness and transparency, of the selected window screen of the plurality of window screens configuring the stack structure. The controller 180 may apply graphic effects for emphasizing the outer border of the selected window screen.

The user may select any one of the plurality of window screens via touch, motion input, etc. An initially selected window screen may be an uppermost window screen. Upon entering the window screen movement mode, the uppermost window screen may be automatically selected without special user input.

Thereafter, when a predetermined command is received from the user (S730), the controller 180 may perform control to perform operation corresponding to the received command.

When the user inputs a cancellation command (S740), the controller 180 may perform control to return to the window screen of the foreground task upon entering the window screen movement mode, that is, the uppermost activity (S750) and to finish the window screen movement mode. The cancellation command may be set to correspond to a predetermined button and/or predetermined operation. For example, when the user touches the back button, the controller 180 may return to a previous step preceding the step of entering the window screen movement mode to finish the window screen movement mode.

When user input corresponds to a movement command (S780), the controller 180 may select one screen from among the plurality of window screens (S790). That is, the controller 180 may move to the selected window screen and change a window screen selected as a main screen.

The movement command of the user may be input of dragging in a predetermined direction or input of tilting the portable terminal in a predetermined direction.

In this case, step S790 of selecting one of the plurality of window screens may include changing the selected window screen according to the direction of dragging input or tilting input.

In addition, the controller 180 may change the selected window screen to a window screen of a different layer among the plurality of layers when the dragging input or the tilting input is performed in a first direction and change the selected window screen to a window screen of the same layer when the dragging input or the tilting input is performed in a second direction. That is, the controller 180 may move the window screen in different directions according to the direction of user input. For example, when the user performs touch input of dragging left and right or tilts the portable terminal left and right, the selected window screen may be changed to a window screen arranged at a layer located above or under the currently selected window screen. When the user performs touch input of dragging upward and downward or tilts the portable terminal backward and forward, the selected window screen may be changed to another window screen arranged at the same layer as the currently selected window screen.

In the method of operating the portable according to one embodiment of the present invention, in step S790 of selecting one of the plurality of window screens, when a plurality of window screens corresponds to the movement command of the user, a more recently selected window screen may be selected.

According to the embodiment, according to change in movement and selection of the window screen, the controller 180 may change the display state of the selected window screen (S720).

In addition, the controller 180 may change the display state of at least some regions of the window screen stacked on the selected window screen among the plurality of window screens. For example, the controller 180 may change transparency of the window screens located on the selected window screen by movement (S795).

Step S795 of changing transparency may include increasing transparency of at least some regions of the window screen stacked on the selected window screen.

Step S795 of changing transparency may include changing a region excluding a border region of the window screen stacked on the selected window screen to be made transparent.

When a command input by the user corresponds to a final decision command (S760), the controller 180 may perform control to display the selected window screen as a foreground screen, that is, the full screen of the display 151 (S770) and to finish the window screen movement mode.

For example, when one region of the selected window screen or the screen of the display 151 is touched, the controller 180 may perform control to determine the selected window screen as the foreground screen and displays the selected window screen as the full screen of the display 151. The decision command may be long press input of maintaining a touch state for a predetermined time or more.

Figure 8:
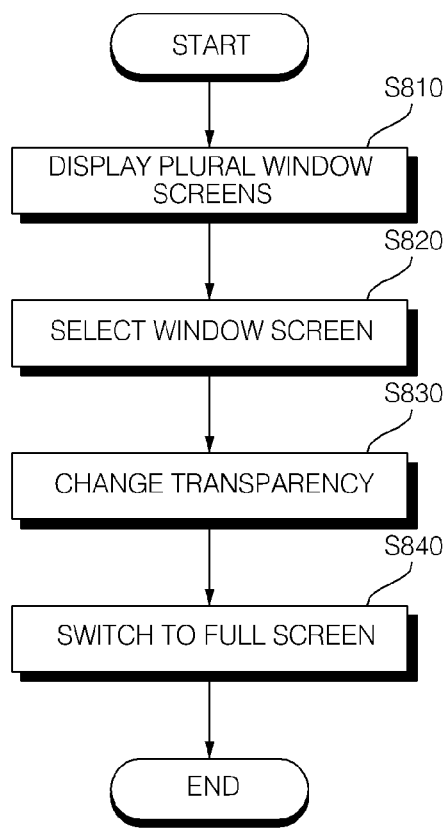
FIG. 8 is a flowchart illustrating a method of operating a portable terminal according to one embodiment of the present invention.
Figure 9:
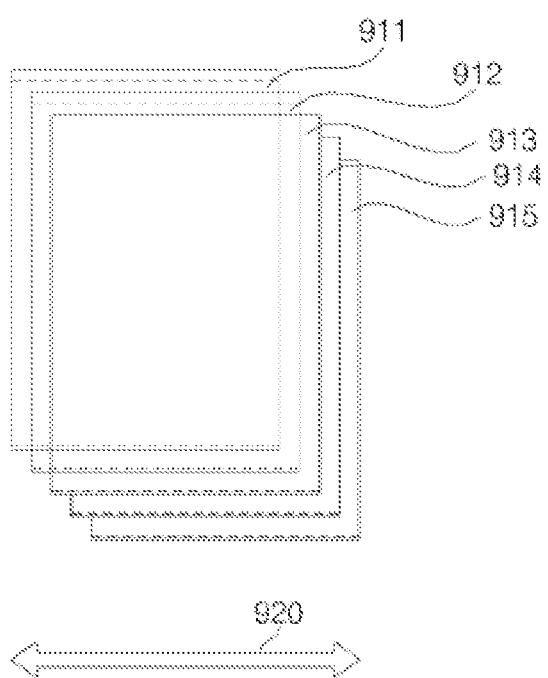
FIGS. 9 to 15 are views referred to for describing a method for operating a portable terminal according to various embodiments of the present invention.

FIG. 8 is a flowchart illustrating a method of operating a portable terminal according to one embodiment of the present invention.

The method of operating the portable terminal according to one embodiment of the present invention may include step S810 of stacking and displaying a plurality of window screens in a plurality of layers, step S820 of selecting one of the plurality of window screens according to a movement command of a user, step S830 of changing transparency of at least some regions of a window screen stacked on the selected window screen and step S840 of displaying the selected window screen as a full screen when input of deciding the selected window screen is received.

The present embodiment is similar to the embodiment described with reference to FIG. 7 and thus the above-described features are equally or similarly applicable.

For example, in step S810 of displaying the plurality of window screens, the window screen of a recently used task may be displayed at an upper side.

The movement command of the user may be input of dragging in a predetermined direction or input of tilting the portable terminal in a predetermined direction. In this case, step S820 of selecting one of the plurality of window screens may include changing the selected window screen according to the direction of dragging input or tilting input. In addition, the controller 180 may change the selected window screen to a window screen of a different layer among the plurality of layers when the dragging input or the tilting input is performed in a first direction and change the selected window screen to a window screen of the same layer when the dragging input or the tilting input is performed in a second direction.

FIGS. 9 to 15 are views referred to for describing a method for operating a portable terminal according to various embodiments of the present invention.

Referring to the figures, according to the embodiment of the present invention, a plurality of window screens 911, 912, 913, 914 and 915 may be displayed in a stack structure composed of a plurality of layers.

In the present invention, the selected window screen may be changed according to directional input. For example, when the user touches a screen and drags to the right or left 920, a specific screen may be selected as a main screen according to a sliding distance. Alternatively, when the portable terminal is tilted in a right or left direction (920), a specific screen may be selected as a main screen according to a tilting direction and angle.

The controller 180 may increase the transparency of the screens located on the selected main screen to make the screens transparent.

When the user touches a currently opaque screen or a predetermined location of a display region of the display 151, the window screen may be displayed as the full screen and the window movement and selection process may be finished.

Accordingly, switching between screens is easily performed and the present invention is applicable to all devices for displaying and utilizing one window screen in the foreground due to limited screen size.

At least one of the plurality of layers configuring a stack structure may include two or more window screens.

Figure 10:
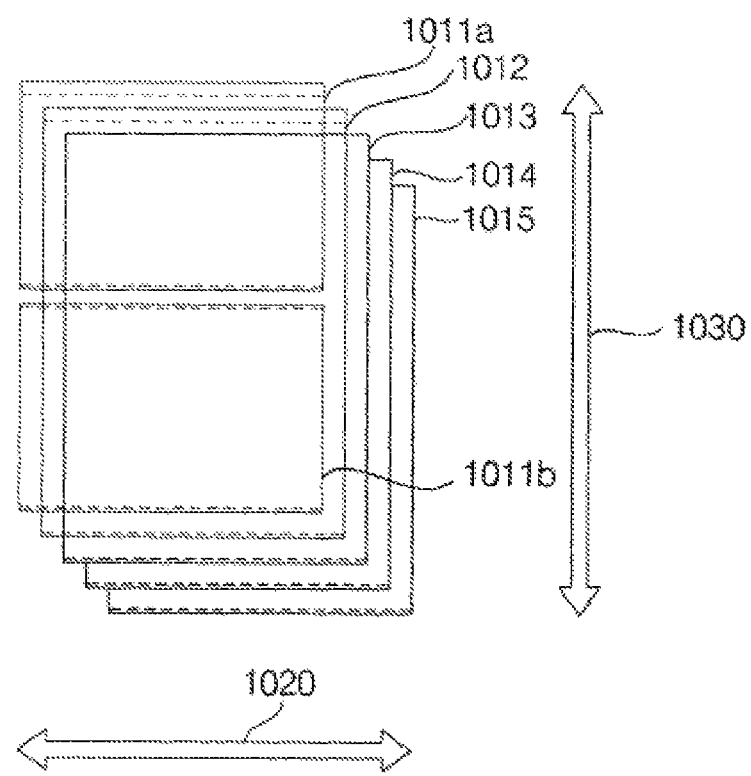

Referring to FIG. 10, an arbitrary layer includes two window screens 1011a and 1011b and layers located thereunder respectively include window screens 1012, 1013, 1014 and 1015.

In this case, the controller 180 may perform control to change the selected window screen to a window screen of a different layer among the plurality of layers when dragging input or tilting input is performed in a first direction 1020 and to change the selected window screen to a window screen of the same layer when dragging input or tilting input is performed in a second direction 1030.

For example, in the case where one 1011a of the window screens 1011a and 1011b of the same layer is selected, when the user drags downward or tilts the portable terminal downward, the window screen may be changed to the window screen 1011b of the same layer. In the case where the window screen 1011b is selected, the selected window screen may be changed by input of an opposite direction.

When the user touches the screen and drags left or right 1020, a specific screen of a different layer may be selected as a main screen. Alternatively, when the portable terminal is tilted in a right or left direction 1020, a specific screen of a different layer may be selected as a main screen according to the tilt direction.

FIGS. 11 to 14 are views referred to for describing a stack structure of window screens and a method of moving a selected window screen according to an embodiment of the present invention. FIGS. 11 to 14 show operation according to a predetermined direction and the present invention is not limited thereto and may be mapped to other operations.

Figure 11:
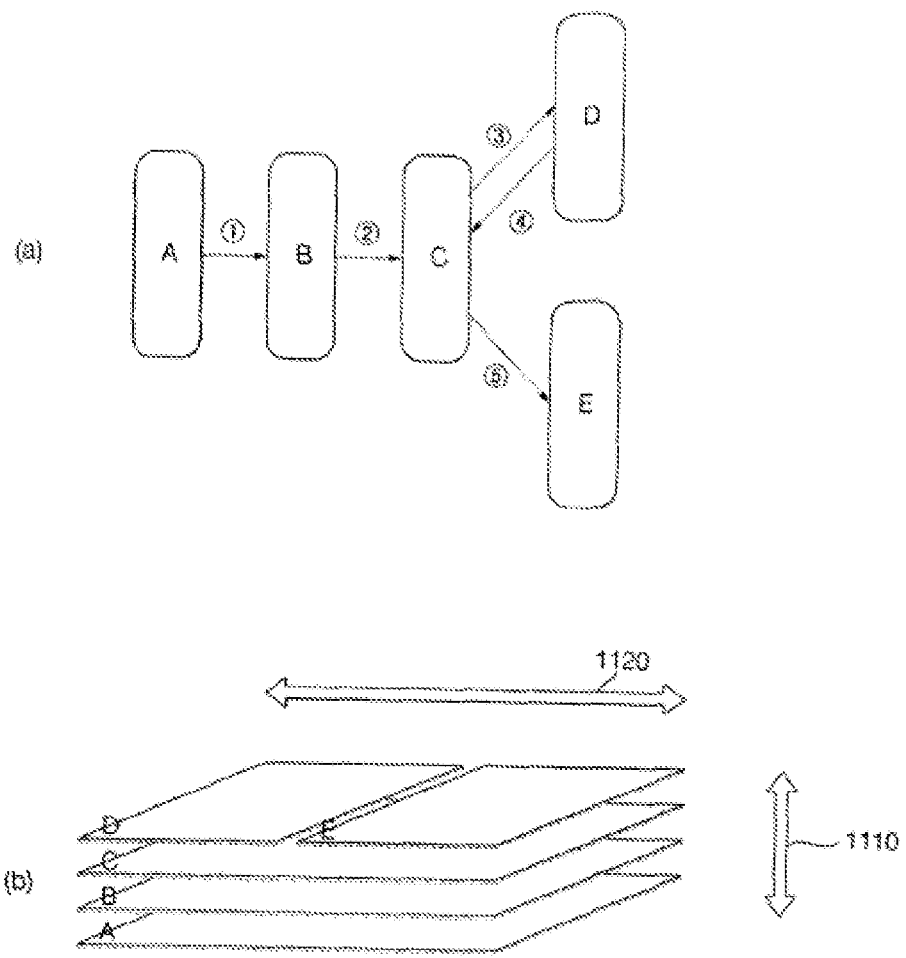

Referring to (a) and (b) of FIG. 11, when the user uses a plurality of window screens in order of A, B, C, D, C and E, the window screens A, B and C are sequentially stacked and two window screens D and E are stacked on the window screen C.

In a state in which a predetermined item is selected on the window screen C to return to the window screen C via back button input in a state of displaying the window screen D and then the window screen E is selected, branched window screens D and E are generated based on the window screen C.

The window screen stack structure according to the embodiment of the present invention may be formed similarly to use order of the user. As shown in FIG. 11, a previous screen of an arbitrary window screen is arranged under the arbitrary window screen and a next window screen of the arbitrary window screen is arranged above the arbitrary window screen. In addition, the next window screens D and E of the window screen C are arranged at the same layer.

The controller 180 may perform control to change the selected window screen to a window screen of a different layer among the plurality of layers when the dragging input or the tilting input is performed in a first direction and change the selected window screen to a window screen of the same layer when the dragging input or the tilting input is performed in a second direction.

When the user drags or tilts the portable terminal in a left direction in a state of selecting the window screen B, the selected window screen may be changed to the window A located under the window screen B. In contrast, when the user drags or tilts the portable terminal in a right direction in a state of selecting the window screen B, the selected window screen may be changed to the window C located above the window screen B. When input in the upper and lower direction is received, a window screen, to which the selected window screen will be changed, is not present and thus the selected window screen B may be maintained.

When the user drags or tilts the portable terminal in a left direction in a state of selecting the window screen C, the selected window screen may be changed to the window screen B located under the selected window screen C.

When the user drags or tilts the portable terminal in a right direction in a state of selecting the window screen C, the selected window screen may be changed to the window screen D or E located above the selected window screen C. In this case, according to the embodiment, a more recently used window screen E may be selected.

When input in the upper and lower direction is received, a window screen, to which the selected window screen will be changed, is not present and thus the selected window screen C may be maintained. In this case, according to the embodiment, the window screen D may be displayed in a deep color if input in an upper direction is received and the window screen E may be displayed in a deep color if input in a lower direction is received. In this state, when the user drags or tilts the portable terminal in a right direction, the selected window screen may be changed to the window screen displayed in the deep color between the window screens D and E located above the selected window screen.

Conventionally, since the window screens are linearly aligned and managed according to use history, several steps may be performed for switching between the window screens D and E. However, according to the embodiment of the present invention, only one step is performed for switching between the window screens D and E.

Figure 12:
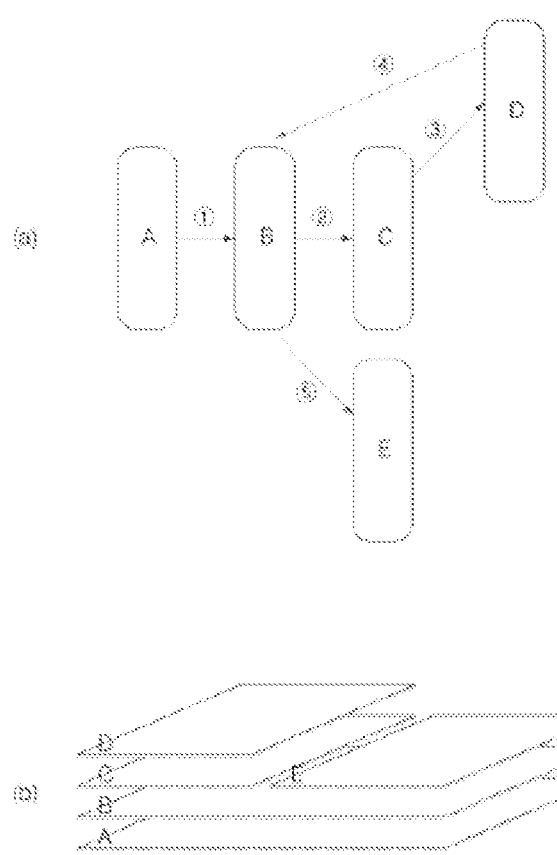

Referring to (a) and (b) of FIG. 12, when the user uses a plurality of window screens in order of A, B, C, D, B and E, the window screens A and B are sequentially stacked and two window screens C and D are stacked on the window screen B. In addition, the window screen D is stacked on the window screen C.

When the user drags or tilts the portable terminal in a left direction in a state of selecting the window screen C, the selected window screen may be changed to the window screen B located under the selected window screen. When the user drags or tilts the portable terminal in a right direction in a state of selecting the window screen C, the selected window screen may be changed to the window screen D located above the selected window screen.

When input in the upper direction is received, a window screen, to which the selected window screen will be changed, is not present and thus the selected window screen C may be maintained. When input in the lower direction is received, the window screen E may be selected.

When the user drags or tilts the portable terminal in a left direction in a state of selecting the window screen D, the selected window screen may be changed to the window screen C located under the selected window screen. When the user drags or tilts the portable terminal in another direction, a window screen, to which the selected window screen will be changed, is not present and thus the selected window screen D may be maintained.

According to the embodiment, when the user drags or tilts the portable terminal in a lower direction in a state of selecting the window screen D, the selected window screen may jump to the window screen E.

Figure 13:
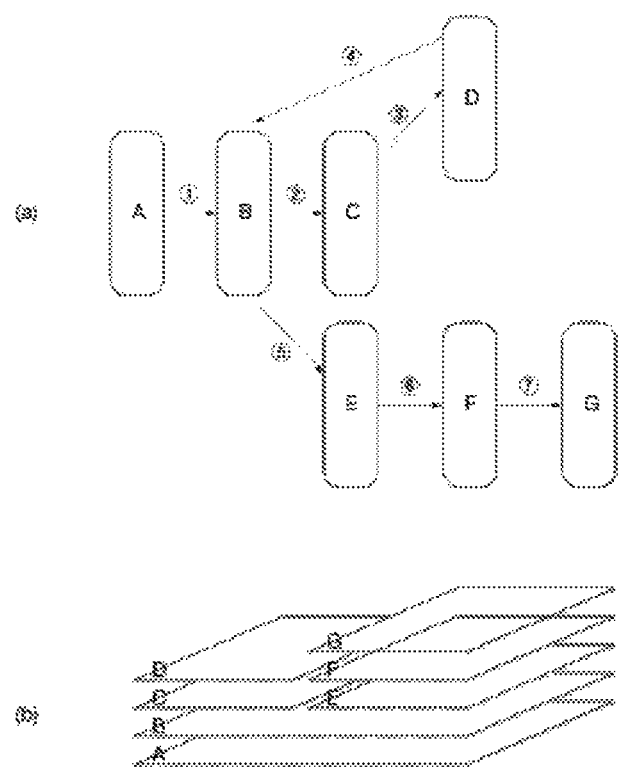

Referring to (a) and (b) of FIG. 13, when the user uses a plurality of window screens in order of A, B, C, D, B, E, F and G, the window screens A and B are sequentially stacked and two window screens C and D are stacked on the window screen B. In addition, the window screen D is stacked on the window screen C and the window screens F and G are stacked on the window screen E.

Even in this case, as described with reference to FIG. 12, when the user drags or tilts the portable terminal in a lower direction in a state of selecting the window screen G, the selected window screen jumps to the window screen D, thereby significantly increasing the movement speed of the window screen.

Figure 14:
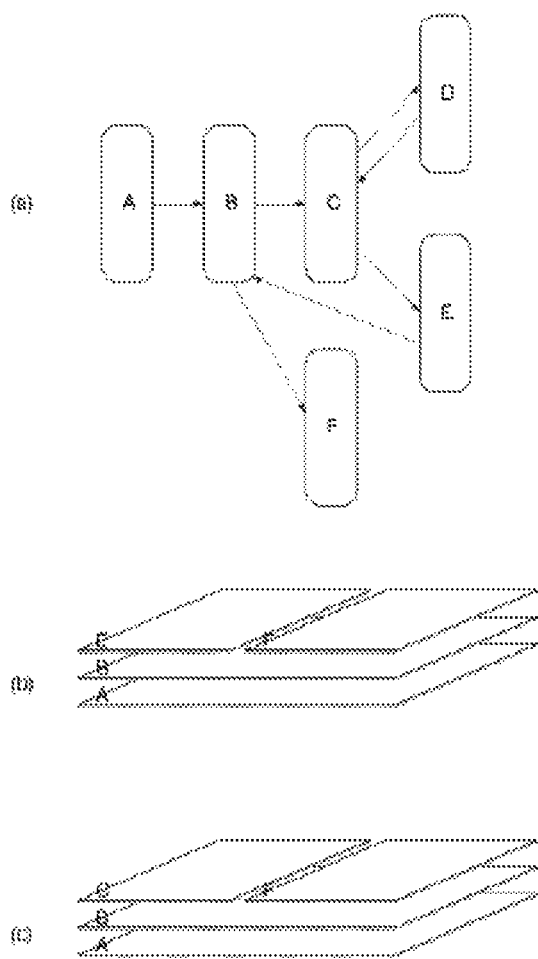
Figure 15:
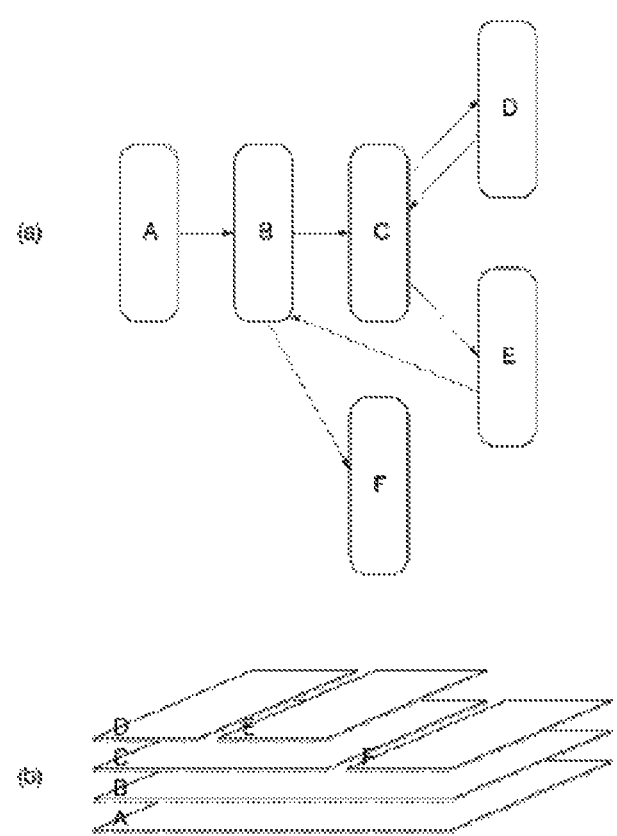

FIGS. 14 and 15 show various embodiments of forming a stack structure when the user uses a plurality of window screens in order of A, B, C, D, C, E, B and F.

(b) and (c) of FIG. 14 show embodiments of deleting an arbitrary window screen according to settings.

Referring to (b) of FIG. 14, the window screens A and B are sequentially stacked and two window screens E and F are stacked on the window screen B. That is, the use history of the window screens C and D is deleted. In this case, if branches are formed, two most recently used branches are maintained. Referring to (c) of FIG. 14, the window screens A and B are sequentially stacked and two window screens C and F are stacked on the window screen B. That is, the use history of the window screens D and E is deleted. In this case, if branches are formed, two branches to be located at an uppermost layer may be deleted via back button input.

Referring to (b) of FIG. 15, the window screens A and B are sequentially stacked and two window screens C and F are stacked on the window screen B. In addition, two window screens D and E are stacked on the window screen C. In this case, a maximum number of window screens allowed in a memory space may be maintained.

According to the embodiment of the present invention, an arbitrary window screen may be rapidly selected and a predetermined window screen may be deleted or maintained according to settings. It is possible to freely allow jump or forward movement to a branch while searching the window screens.

According to the embodiments of the present invention, it is possible to rapidly and conveniently switch screens and tasks, to provide visual effects, and to improve user convenience.

The portable terminal and the method of operating the same according to the foregoing embodiments are not restricted to the configuration and method of the embodiments set forth herein. Therefore, some or all of the above-described embodiments are selectively combined to make various modifications.

The portable terminal according to the foregoing embodiments may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed over a plurality of computer systems connected to a network so that processor-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

The invention claimed is:

1. A method of operating a portable terminal, the method comprising:
   entering a window screen movement mode in which a window screen of a foreground task is displayed on top and window screens of background tasks are displayed under the window screen of the foreground task;
   displaying the window screens of the background tasks to be stacked in a plurality of layers in accordance with an order in which the background tasks are used;
   selecting one of a plurality of window screens including the window screen of the foreground task and the window screens of the background tasks according to a movement command of a user;
   changing a display state of the selected window screen;
   changing transparency of at least some regions of at least one of window screens stacked on the selected window screen among the plurality of window screens;
   displaying the selected window screen as a foreground screen and finishing the window screen movement mode, when input of deciding the selected window screen is received; and
   deleting an arbitrary window screen according to settings among the window screens of the background tasks,
   wherein the displaying the window screens includes displaying a window screen of a first task of a first task group and a window screen of a first task of a second task group on a layer which is positioned above a layer including a window screen of a specific task when the specific task and the second task group are sequentially used after the specific task and the first task group are used in turn, wherein the specific task, the first task group, and the second task group are included in the background tasks,
   wherein the changing transparency includes increasing transparency of at least some regions of the at least one window screen stacked on the selected window screen,
   wherein the movement command of the user is input of dragging or tilting the portable terminal in a predetermined direction,
   wherein the selecting one of the plurality of window screens includes changing the selected window screen according to a direction of the dragging or tilting input,
   wherein the selecting one of the plurality of window screens includes changing the selected window screen to a window screen of a different layer among the plurality of layers when the dragging or tilting input is performed in a first direction and changing the selected window screen to a window screen of the same layer when the dragging or tilting input is performed in a second layer, and
   wherein the selecting one of the plurality of window screens includes selecting a more recently used window screen when a plurality of window screens corresponds to the movement command of the user.

2. The method according to claim 1, wherein the entering the window screen movement mode includes displaying only some regions of the window screens staked under the window screen of the foreground task.

3. The method according to claim 1, wherein the entering the window screen movement mode includes displaying the window screens such that a window screen of a recently used task is located at a higher layer.

4. The method according to claim 1, wherein the entering the window screen movement mode includes scaling down and displaying the window screens of the foreground tasks.

5. The method according to claim 1, wherein the changing transparency includes changing a region excluding a border region of a window screen stacked on the selected window screen to be made transparent.

6. The method according to claim 1, further comprising returning to the window screen of the foreground task upon entering the window screen movement mode and finishing the window screen movement mode according to a cancellation command of the user.

7. A method of operating a portable terminal, the method comprising:
   stacking and displaying a plurality of window screens in a plurality of layers in accordance with an order in which tasks according to the plurality of window screens are used;
   selecting one of the plurality of window screens according to a movement command of a user;
   changing a display state of the selected window screen;
   changing transparency of at least some regions of at least one window screen stacked on the selected window screen among the plurality of window screens;
   displaying the selected window screen as a full screen when input of deciding the selected window screen is received; and
   deleting an arbitrary window screen according to settings among window screens that are stacked in the plurality of layers,
   wherein the displaying the plurality of window screens includes displaying a window screen of a first task of a first task group and a window screen of a first task of a second task group on a layer which is positioned above a layer including a window screen of a specific task when the specific task and the second task group are sequentially used after the specific task and the first task group are used in turn, wherein the specific task, the first task group, and the second task group are included in the tasks according to the plurality of window screens,
   wherein the changing transparency includes increasing transparency of at least some regions of the at least one window screen stacked on the selected window screen,
   wherein the movement command of the user is input of dragging or tilting the portable terminal in a predetermined direction,
   wherein the selecting one of the plurality of window screens includes changing the selected window screen according to a direction of the dragging or tilting input,
   wherein the selecting one of the plurality of window screens includes changing the selected window screen to a window screen of a different layer among the plurality of layers when the dragging or tilting input is performed in a first direction and changing the selected window screen to a window screen of the same layer when the dragging or tilting input is performed in a second layer, and wherein the selecting one of the plurality of window screens includes selecting a more recently used window screen when a plurality of window screens corresponds to the movement command of the user.

8. The method according to claim 7, wherein the displaying the window screens includes displaying a window screen of a recently used task at a higher layer.

9. The method according to claim 1, wherein the arbitrary window screen is a window screen located at an uppermost layer.

10. The method according to claim 7, wherein the arbitrary window screen is a window screen located at an uppermost layer.

* * * * *